No. 762,153. PATENTED JUNE 7, 1904.
D. D. DENNIS.
WATER ELEVATOR.
APPLICATION FILED APR. 23, 1904.
NO MODEL. 2 SHEETS—SHEET 1.
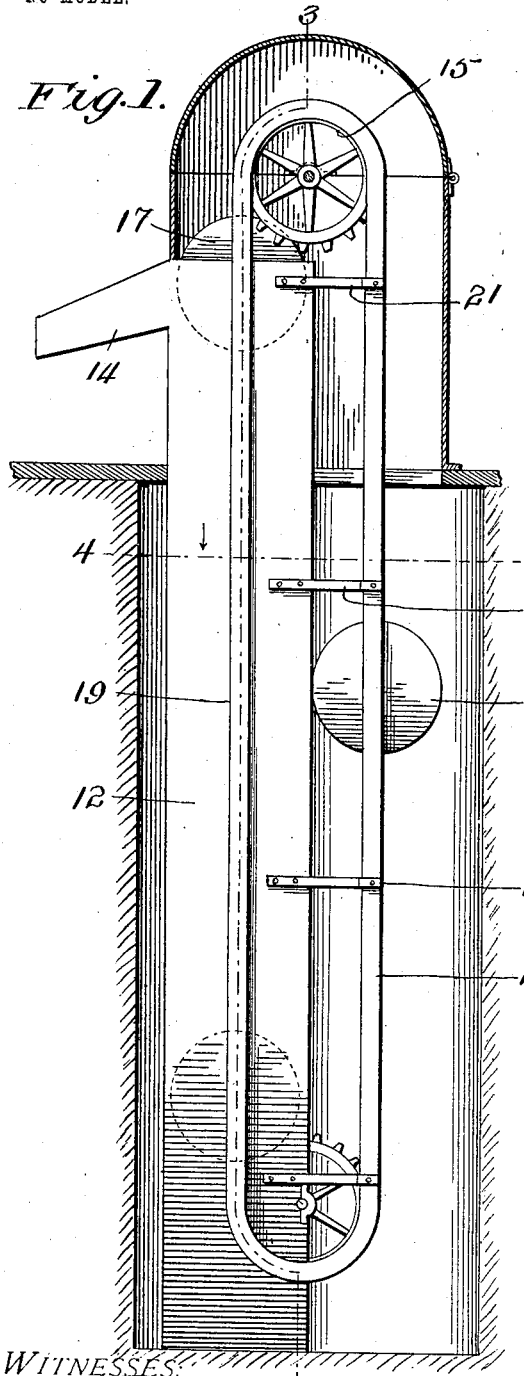
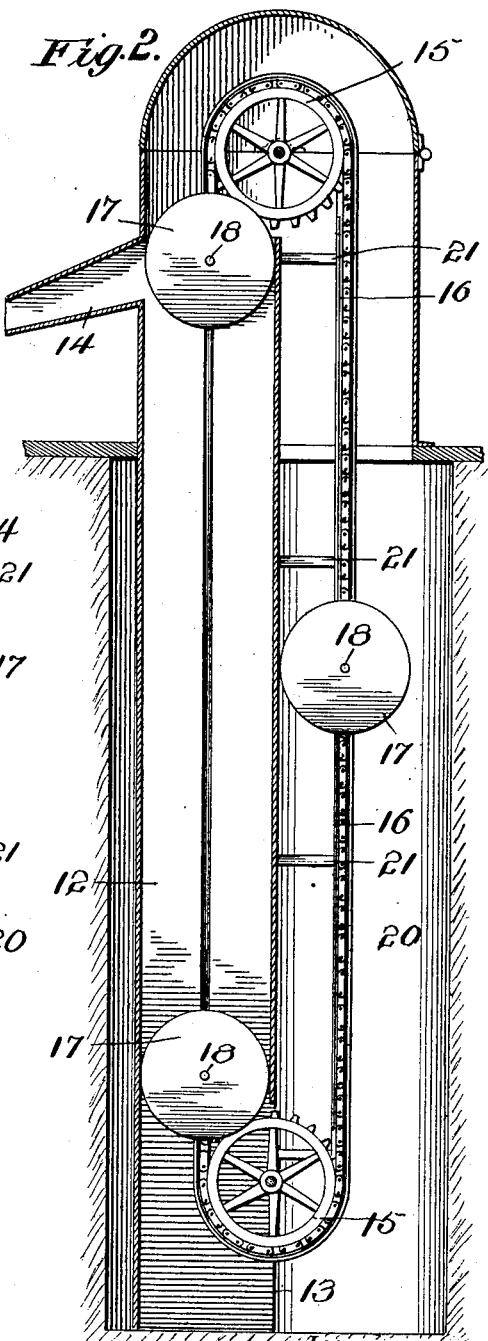

No. 762,153. PATENTED JUNE 7, 1904.
D. D. DENNIS.
WATER ELEVATOR.
APPLICATION FILED APR. 23, 1904.
NO MODEL. 2 SHEETS—SHEET 2.
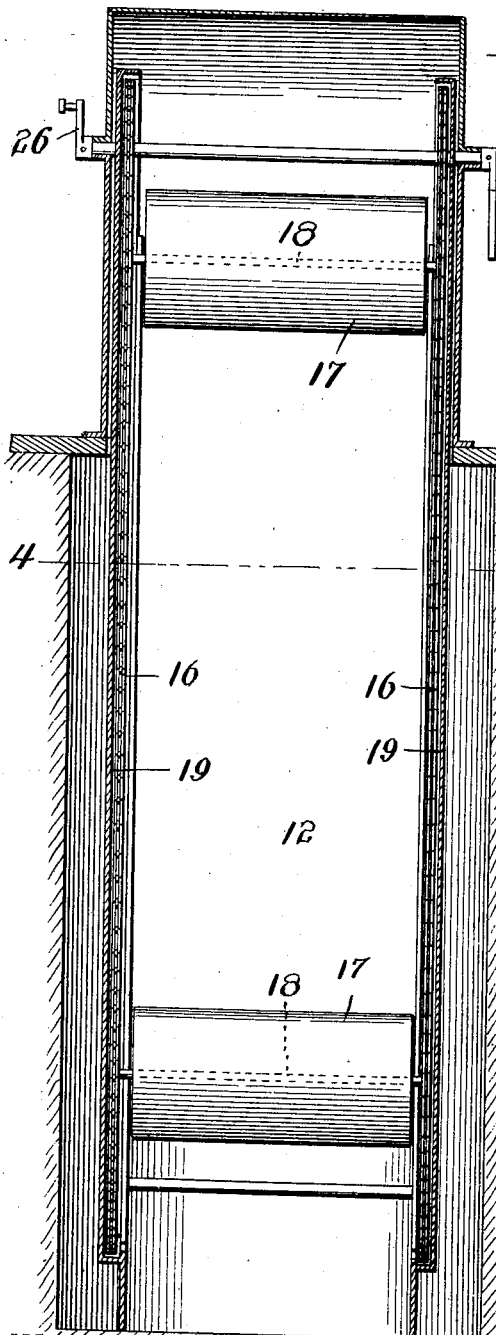
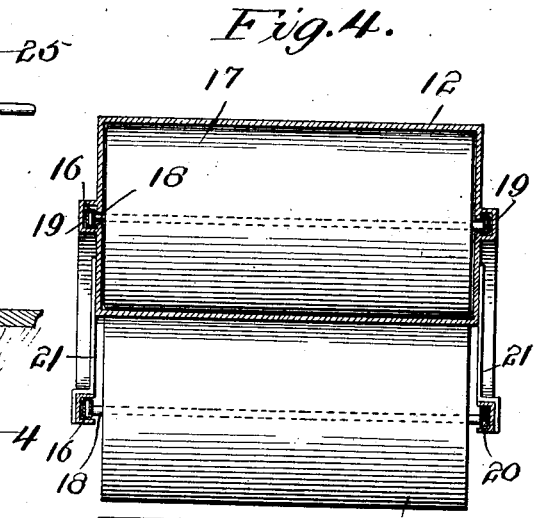
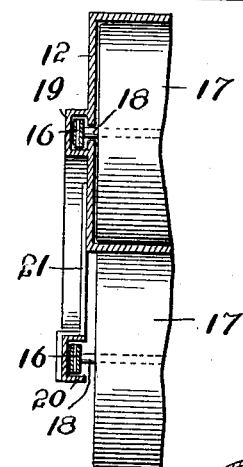
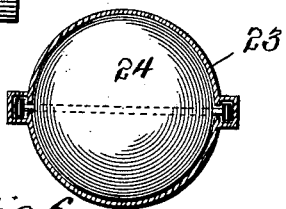

No. 762,153. Patented June 7, 1904.

UNITED STATES PATENT OFFICE.

DECATUR D. DENNIS, OF NEW ORLEANS, LOUISIANA.

WATER-ELEVATOR.

SPECIFICATION forming part of Letters Patent No. 762,153, dated June 7, 1904.

Application filed April 23, 1904. Serial No. 204,625. (No model.)

*To all whom it may concern:*

Be it known that I, DECATUR D. DENNIS, a citizen of the United States, residing at New Orleans, in the parish of Orleans and State of Louisiana, have invented certain new and useful Improvements in Water-Elevators, of which the following is a specification, reference being had therein to the accompanying drawings.

This invention relates to water-elevators of that class in which elevating elements are carried by endless chains driven by sprocket-wheels; and it has for its object to provide a liquid-elevating apparatus of the class referred to which will be simple in construction, so that it will be inexpensive to manufacture, and which will be efficient in operation, so that it will run easily and work satisfactorily.

To these ends the invention comprises a suitable framework having a tube in which the water or other liquid is to be elevated, and having a close-running fit in the said tube are rotating elevating elements, preferably in the form of hollow cylinders or rollers carried by endless chains running over sprocket-wheels arranged at opposite sides or ends of the tube and which sprocket-wheels are a suitable distance apart, so that the liquid-elevating rollers or cylinders can pass between them as they are carried by the endless chains around the sprocket-wheels.

In the accompanying drawings, Figure 1 is an end elevation, partly broken out, of an apparatus embodying the present invention. Fig. 2 is a central vertical section of the same. Fig. 3 is a vertical section taken at right angles to Fig. 2. Fig. 4 is a cross-section of the apparatus on line 4 4, Fig. 1, but on a somewhat larger scale. Fig. 5 is a detail cross-section of a portion of the apparatus still further enlarged to show the grooves and housings in which the endless chains run. Fig. 6 is a horizontal sectional view illustrating a modified form of the invention.

Referring to the drawings, 12 denotes a tube, which, as herein shown, is rectangular in cross-section, but which may be of any other suitable form. The tube 12 will be of a suitable length to reach down to the water in a well or other receptacle from which it may be desired to raise water or any other liquid. The said tube is made partly open at one side at its bottom, as at 13, and is also open at its top and is provided at its top with a suitable spout 14 for the discharge of the water or other liquid to be elevated.

Supported in suitable bearings in the framework, of which the tube 12 may be a portion, are sprocket-wheels 15, over which run endless chains 16, carrying cylinders or other suitable elevating elements 17 of suitable size to have a close-running fit in the tube 12. If the said tube be square or rectangular in cross-section, the elevating elements 17 will be of cylindrical form; but if the said tube be circular in cross-section, as shown at 23 in Fig. 6, the elevating elements will be in the form of balls 24 to fit the said tube. The rotating elevating elements or cylinders 17 are hung to the chains 16 by means of pivot pins or rods 18, so that they may be free to rotate.

The endless chains 16 are fitted to run in grooves 19, formed at the sides or ends of the tube 12, the pivot rods or pins 22 of the said cylinders or rotating elevating elements passing from the said cylinders or elevating elements through slots into the said chain-receiving grooves 19. The descending portions of the said chains are partly housed in troughs or casings 20, supported from the tube 12 by means of suitable brackets 21, these casings serving to steady the descending portions of the chains and the rotating elements carried thereby as the latter are carried downward.

The tube 12 and the casings 20 will preferably be of sheet-iron or other similar material and the rotating elevating elements or cylinders 17 24, will preferably be hollow and may also be made of sheet-iron or cast-iron or any other suitable material. It is essential that the rotating elevating elements or cylinders should have a close-running fit in the tubes 12 or 23, so as to operate in raising the liquid to be elevated by suction or partly by suction and partly mechanically.

From the foregoing it will be understood that the invention provides a comparatively simple liquid-elevating apparatus which may be easily operated and by means of which a large quantity of water or other liquid can be raised at a given time. The liquid-elevator may be operated either manually, as by means of a crank 25, or it may be connected with an engine or any other suitable motive power by means of a crank 26.

Having thus described my invention, I claim and desire to secure by Letters Patent—

1. A liquid-elevating apparatus comprising the combination with a suitable tube, of liquid-elevating elements closely fitting said tube, endless chains at opposite sides of said tubes and by which the said liquid-elevating elements are carried, and with which said elements are connected so as to be free to rotate, and sprocket-wheels over which the said chains run.

2. A liquid-elevating apparatus comprising the combination with a suitable tube, of liquid-elevating elements closely fitting said tube, endless chains at opposite sides of said tube and by which the said liquid-elevating elements are carried, and with which said elements are connected so as to be free to rotate, and sprocket-wheels over which the said chains run, said tube being provided at its sides with grooves to receive the said chains.

3. A liquid-elevating apparatus comprising the combination with a suitable tube, of liquid-elevating elements closely fitting said tube, endless chains at opposite sides of said tube and by which the said liquid-elevating elements are carried, and with which said elements are connected so as to be free to rotate, and sprocket-wheels over which the said chains run, said tube being provided at its sides with grooves to receive the said chains, said liquid-elevating elements being of a suitable size to pass between the said sprocket-wheels.

4. A liquid-elevating apparatus comprising the combination with a suitable tube, of rotating liquid-elevating elements closely fitting said tube, endless chains by which the said liquid-elevating elements are carried, sprocket-wheels over which said chains run, said tube being provided at its sides with grooves to receive the upwardly-running portions of said chains, and housings receiving the downwardly-running portions of said chains and serving to steady the same and the rotating liquid-elevating elements carried thereby.

In testimony whereof I affix my signature in presence of two witnesses.

DECATUR D. DENNIS.

Witnesses:
HENRY CALVER,
GEO. W. REA.